May 19, 1964 E. A. NEWMAN ET AL 3,134,092

ELECTRONIC DIGITAL COMPUTERS

Original Filed Feb. 5, 1954 6 Sheets-Sheet 1

Inventors
Edward Arthur Newman and David Oswald Clayden
By
Stevens, Davis, Miller & Mosher
Attorneys May 19, 1964 E. A. NEWMAN ET AL 3,134,092

ELECTRONIC DIGITAL COMPUTERS

Original Filed Feb. 5, 1954 6 Sheets-Sheet 2

Inventors
Edward Arthur Newman and David Oswald Clayden
By
Stevens, Davis, Miller & Mosher
Attorneys Edward Arthur Newman and David Oswald Clayden Inventors
By
Stevens, Davis, Miller & Mosher
Attorneys May 19, 1964 E. A. NEWMAN ET AL 3,134,092

ELECTRONIC DIGITAL COMPUTERS

Original Filed Feb. 5, 1954 6 Sheets-Sheet 4

Inventors
Edward Arthur Newman and David Oswald Clayden
By
Stevens, Davis, Miller & Mosher
Attorneys Inventors
Edward Arthur Newman and David Oswald Clayden
By
Stevens, Davis, Miller & Mosher
Attorneys May 19, 1964 E. A. NEWMAN ET AL 3,134,092

ELECTRONIC DIGITAL COMPUTERS

Original Filed Feb. 5, 1954

6 Sheets-Sheet 6

Inventors
Edward Arthur Newman and David Oswald Clayden
By
Stevens, Davis, Miller & Mosher
Attorneys United States Patent Office 3,134,092

Patented May 19, 1964

3,134,092
ELECTRONIC DIGITAL COMPUTERS

Edward Arthur Newman, Teddington, and David Oswald Clayden, Heston, England, assignors, by mesne assignments, to International Business Machines Corporation, New York, N.Y., a corporation of New York Original application Feb. 5, 1954, Ser. No. 408,560, now Patent No. 2,978,175. Divided and this application Feb. 12, 1958, Ser. No. 714,846
2 Claims. (Cl. 340—172.5)

This application is a division of patent application Serial No. 408,560, filed February 5, 1954.

The present invention relates to electronic digital computers and is concerned with the arrangements provided in these computers for controlling their operations. This control is exercised by an instruction control which enables special sets of digit signals, called instruction words, to order the passage of other sets of digit signals, called number words, between various parts of the computer so that they undergo various required transformations as steps in computing operations. Digits and sets of digits called words are physically represented in a computer by signals and sets of signals respectively, and in the following description the terms digits and words will conveniently be used for the symbols in either mathematical or physical forms.

A typical instruction control arrangement of a digital computer, when supplied with an instruction word, directs one elementary operation which involves the transference of a number word or words from one part of the computer acting as a source on this occasion, to another part which is a destination on this occasion. In order that it may direct such a transfer, each instruction word is composed of various groups of digits including a group of source digits which specifies the source, a group of destination digits which specifies the destination, and groups which specify the time and duration of a transfer. Also, in order that these elementary operations may take place readily one after another, each instruction word has a group of digits which specify the source of the next instruction word so that it may be automatically fed to the instruction control when the present instruction word has been obeyed.

Many computers employ, in addition to a set of main storage devices all or most of which are immediately concerned in computing processes, supplementary storage devices usually of high capacity and of a different type and which are not directly concerned in the computing operations. For example, U.S. patent application Serial No. 255,888 filed November 13, 1951, by Edward Arthur Newman et al. describes a computer having supplementary storage devices in the form of a magnetic recording drum for storing digits which require to be transferred to the main storage devices before they can take part in any computing operations.

In many computers having two types of digit storage apparatus the limited number of digits in an instruction word is sufficient to enable an elementary operation involving the main storage devices to be controlled, but is insufficient to enable the supplementary storage device to be operated.

It is an object of the present invention to provide a control for a large-capacity supplementary storage device in a computer.

It is a further object of the invention to provide such a control by means of a supplementary instruction word.

It is a further object of the invention to provide such a control using the minimum of equipment by using the output mechanism of the computer.

It is a further object of the invention to provide a control for a large-capacity supplementary storage device the response of which to the control may occasionally be relatively slow.

According to the present invention, there is provided an electronic digital computer having main digital stores, a main control arranged for receiving instruction word signals and controlled by the said instruction word signals, an output staticisor normally for staticising word signals to be fed to the output of the computer, a first transfer path between the main digital store and the output staticisor, a supplementary digital store, supplementary control means for setting up a second transfer path between the main digital store and the supplementary digital store, a first gating means in the first transfer path and connected to the main control to allow words to be transferred from the main digital store to the output staticisor, means including second gating means, connecting the output staticisor to the supplementary control means to control it to set up the said second transfer path, and means connected to the main control for timing a transfer along the said second transfer path.

The invention is thus applicable to computers having digital stores which are organised into a main store and a supplementary store which, consisting only of stores which are not required or able to take part directly in actual computing operations, does not require so many instruction digits to control it as does the main digital store. Then by the invention a group of instruction digits not so required is organised so that when this group is of a predetermined special permutation a group of different instruction digits is supplied to operate the control circuits of the supplementary store.

According to a feature of the invention, the instruction digits not required to control the supplementary store have more than one predetermined special permutation and the control circuits of the supplementary store are divided into a corresponding number of sections, each particular section being operated by a corresponding special permutation of instruction digits. This feature of the invention may be advantageously applied to certain types of large capacity magnetic stores in a manner which will be more fully described later.

It will be appreciated that when digits of an instruction word act on the supplementary control means they will simultaneously act on the main storage control means as they do normally, unless this normal action is inhibited while the supplementary control means is operated. Generally this inhibition must be done in order to prevent undesirable activity in the main storage devices.

In some computers however, according to a further feature of the invention, it is possible to arrange that only some or even none of the instructions digits need to be restrained from their normal action when they control the supplementary store. This may be done by arranging for the supplementary control means to act when the destination digits of an instruction word are in a selected permutation and for the source digits to be concerned in controlling the supplementary control means.

The invention and its various features will now be more particularly described by means of the following description of various embodiments of the invention. These embodiments, which will be described with reference to the drawings filed with this specification, are concerned with serial-mode electronic binary digital computers which utilise magnetic recording drums in various forms as supplementary storage devices and which are constructed on similar lines to the computers described in U.S. patent application Serial No. 255,888.

In the drawings:

FIGURE 4 shows an arrangement by which one and sometimes two instruction words can be used to control the magnetic store; while

Figure 1:
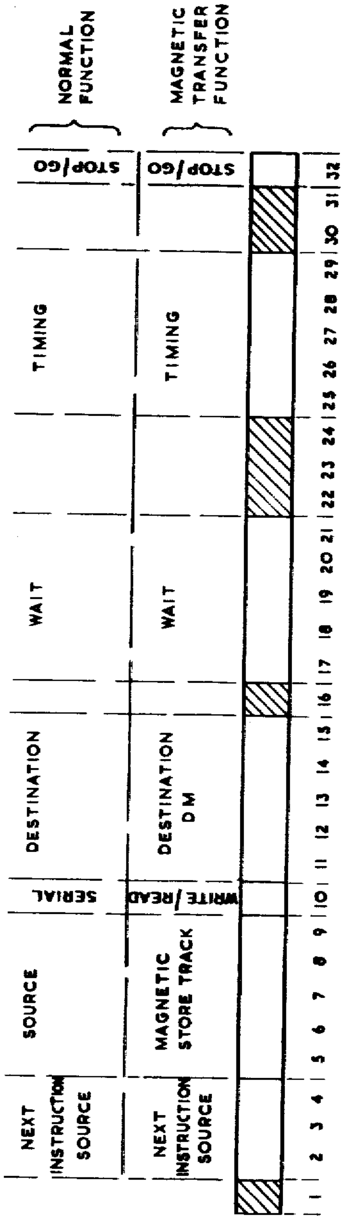
FIGURE 1 illustrates the manner in which the digits of an instruction word can be used normally to control an operation in the main storage system and alternatively to control an operation in the supplementary magnetic store.

Use has been made in the drawings of the Turing notation for representing circuit elements frequently used in electronic digital computers. A full description of this notation and details of circuits that it represents are given in U.S. patent application Serial No. 202,615, filed December 26, 1950, by James H. Wilkinson, now Patent No. 2,686,632, issued August 17, 1954.

FIGURE 1 shows the dual function of an instruction word in a digital computer which has a magnetic supplementary store which is organised in a simple manner so that its control requires less digits of an instruction word than control of the main storage devices does. The magnetic store is organised into 32 locations which are preferably separate tracks on a magnetic recording drum and operation of the magnetic store is limited to the transference of a set of digits equivalent to the contents of one recording track either way between a special main storage device and a specified recording track. Hence if a magnetic transfer is ordered only five instruction digits (having 32 different permutations) are required to specify a selected track out of 32 tracks and one instruction digit to specify whether a set of digits is to be writen onto or read from this track.

The upper part of FIGURE 1 shows the function of the digits of instruction words when they are controlling a transfer of a number word between two main digital stores while the lower part shows the function of the digits when they are controlling a magnetic transfer. When normally used as shown in the upper part, the digits of a 32 digit instruction word include digits 2 to 4 specifying the source of the next instruction word to be obeyed, and source digits 5 to 9 and destination digits 11 to 15 specifying the source and destination in the main storage system between which a number is to be transferred. Digits 10, 17 to 21, 25 to 29 and 32 specify the time and duration of the transfer and the time that the next instruction word is to be obeyed in a manner with which the present invention is not concerned.

An instruction word functions as a magnetic instruction word when its destination digits are in a selected permutation and specify a destination DM. Then the source digits specify a track in the magnetic store to or from which a magnetic transfer is to take place, while the serial digit 10 is used to order a read transfer (if a 1) or a write transfer (if a 0). Although the destination digits must specify the magnetic destination DM this is a normal destination as far as the instruction word is concerned, and the destination digits as well as the remaining digits function in a normal manner.

Figure 2:
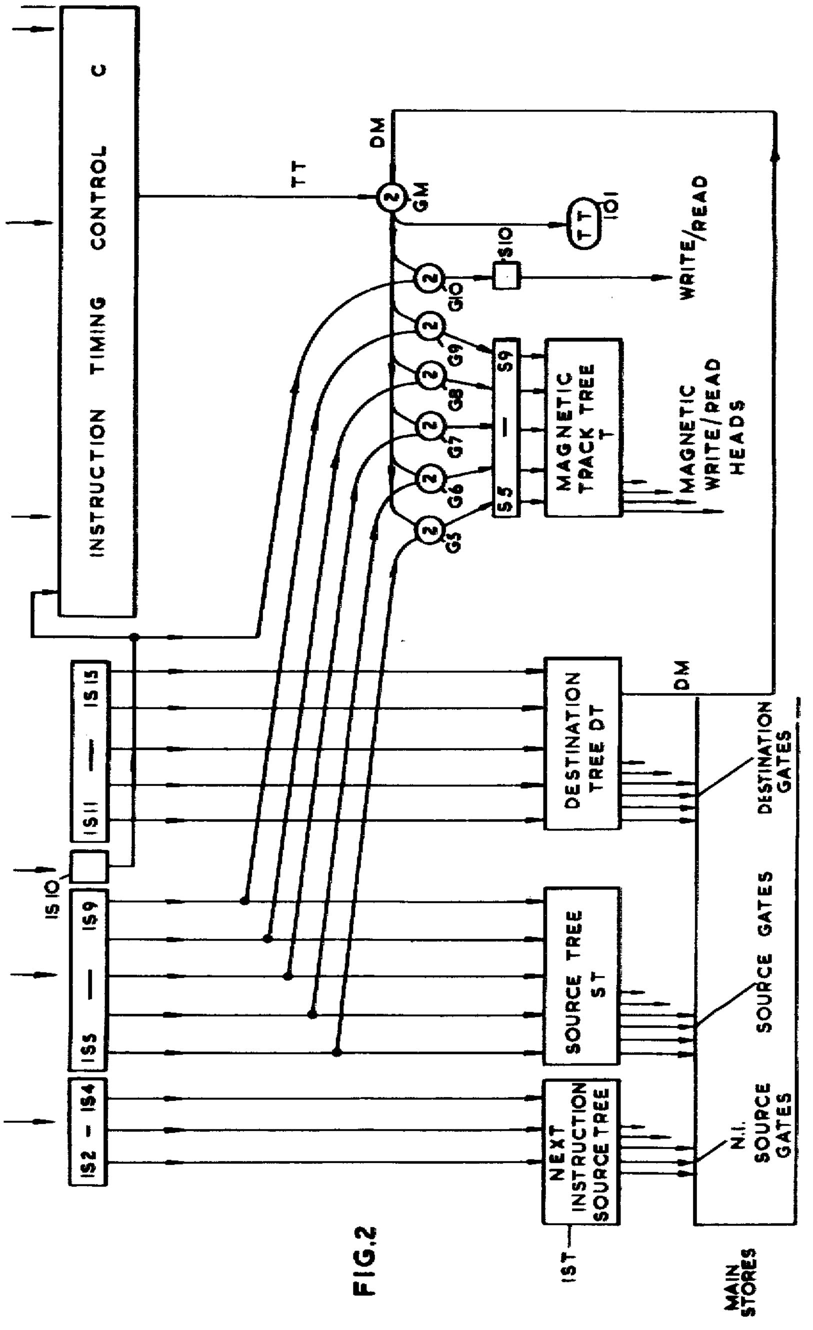
FIGURE 2 shows an arrangement by which an instruction word can control the magnetic store in accordance with the scheme illustrated in FIGURE 1.

In FIGURE 2 is shown the general arrangement of an instruction control for controlling the main storage devices of a computer and magnetic transfers therein by means of instruction words of the form illustrated in FIGURE 1. The digits 2 to 15 in an instruction word admitted to the instruction control circuits are staticised in a set of staticisors IS2 to IS15. The remaining digits which are fed to an instruction timing control C produce an output TT in any known manner when a transfer (normal or magnetic) is to be carried out, in accordance with digits 10, 17 to 21, 25 to 29, and 32. A suitable form of instruction control is described in U.S. patent application Serial No. 290,014, filed May 26, 1952, by Edward Arthur Newman et al.

The staticisors IS2 to IS15 are normally used as shown in FIGURE 2 to set up a next instruction tree IST, a source tree ST and a destination tree DT, thereby opening in accordance with the permutation of source and destination digits a source from which and a destination to which a word or words are to be transferred when an output TT appears from the control C, and specifying the source of the next instruction word to be passed to the instruction control.

In addition to these normal arrangements the following special arrangements are provided which are used when, and only when, the magnetic destination DM is the specified destination. As shown in FIGURE 2, the outputs from the instruction staticisors IS5 to IS10 are connected to gates G5 to G10 in addition to their normal connections to the source tree ST and control C. When an output is delivered from a gate GM, which occurs when the destination tree DT sends an output to DM and the TT output from control C is on, the gates G5 to G10 are open and the outputs of staticisors IS5 to IS10 set up the staticisors S5 to S10.

The magnetic store which is arranged to be controlled by the circuits shown in FIGURE 2 comprises, as previously described, a single magnetic recording drum having 32 recording tracks, and the five staticisors S5 to S9 set up the magnetic track tree T to select the required track. In addition the staticisor S10 is used to direct the magnetic control circuits so that a write or read transfer takes place. The output from the gate GM is used (after passing through suitable delay devices not shown) to set a magnetic transfer timer trigger 101 to commence and time a magnetic transfer.

It will be understood that when a normal transfer is being carried out in compliance with an instruction word set up in the instruction control circuits C, no magnetic transfer can take place as the destination specified is not the destination DM, and hence the gates G5 to G10 remain closed and the magnetic transfer-timer 101 does not go on. If, however, a magnetic transfer is being performed, the source tree ST is set up and opens a source gate when the TT output from the instruction control goes on. A number word or words is thus given access to the highway between the main digital stores of the machine but cannot pass into a destination in a store as no normal destination gate of a store is open, and, the magnetic destination gate GM which is open does not serve to admit signals from the highway to a destination.

When an instruction word is used to control a magnetic transfer the next instruction source digits 2 to 4 must of course specify the next instruction source as they do normally, while the wait digits 17 to 21 and the timing digits 25 to 29 can call for a transfer of any duration at any time compatible with the correct next instruction being admitted to the instruction control circuits (in a manner fully described in U.S. patent application Serial No. 290,014). The wait period and duration of transfer may be as short as is possible in a normal operation of the control circuits, as, whereas the nature of the digits 5 to 10 which specify a magnetic transfer are changed in the instruction staticisors when the next instruction word is admitted to the control circuits, the nature of these digits is retained in staticisors S5 to S10 until the end of a magnetic transfer.

Figure 3:
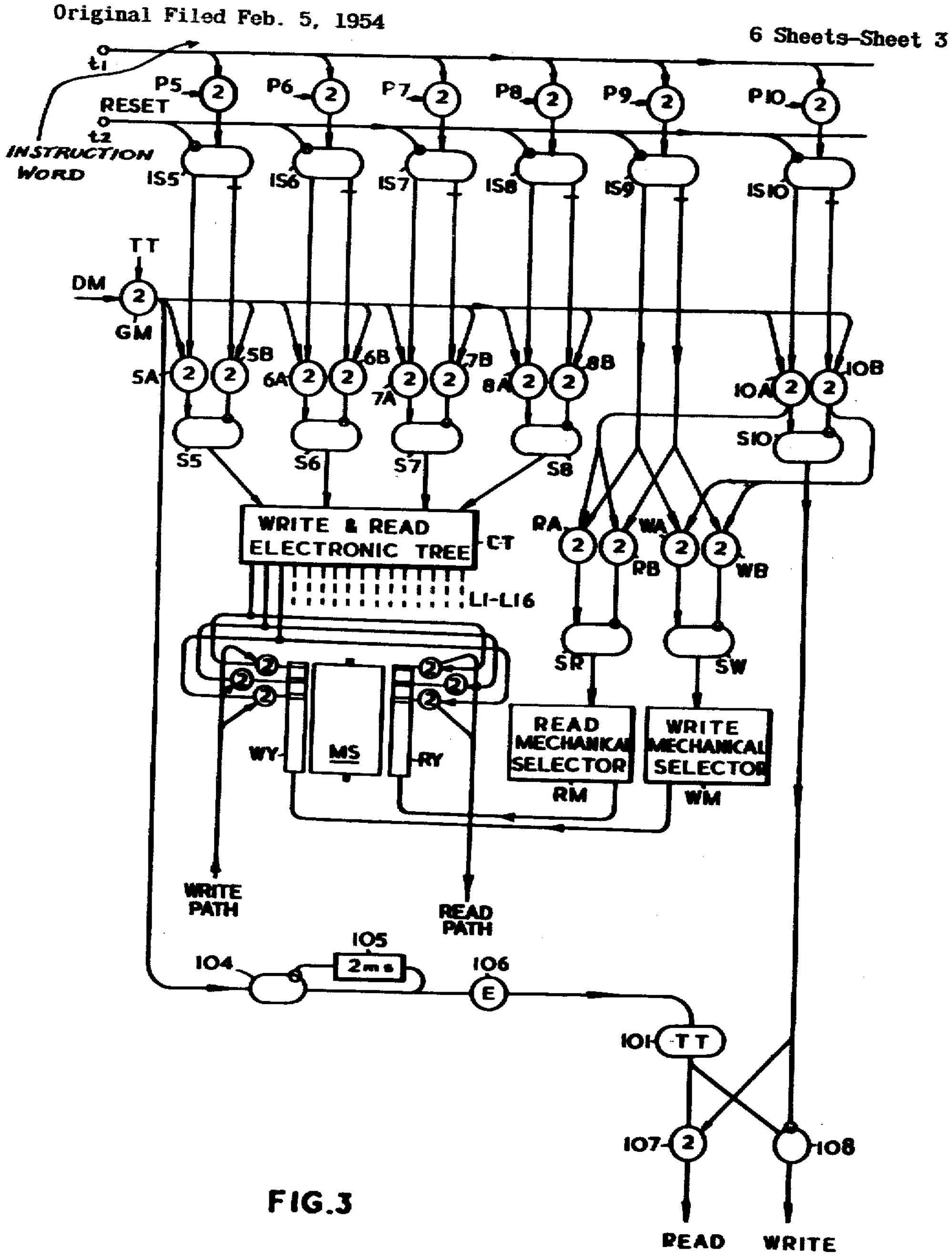
FIGURE 3 shows part of the arrangement shown in FIGURE 2 in greater detail.

FIGURE 3 shows in greater detail the arrangements whereby digits 5 to 10 in an instruction word control a magnetic transfer. The digits 5 to 10 in the instruction word being admitted to the instruction control are fed to the appropriate instruction staticisors IS5 to IS10 from a terminal *t*1 through coincidence gates conditioned by timing pulses P5 to P10 as shown, which occur in step with digits 5 to 10. The instruction staticisors IS5 to IS10 are assumed to have been previously reset by an output on terminal *t*2 which may be the output from the end element 21 as shown in FIGURE 2 of copending U.S. patent application Serial No. 290,014.

The 32 tracks in a magnetic store MS which is controllable by the arrangement shown in FIGURE 3 are laid down by a write head WY assembly of 16 heads arranged to be placed in either of two positions so that each head can write on either of two tracks. Similarly a read head RY assembly of 16 heads each capable of reading from either of two tracks is provided. The digits 5 to 8 in the instruction word are used to specify the writing or reading head required to take part in the transfer, the digit 9 to specify the position of the head assembly concerned in the transfer, while digit 10 is used to call for a write or read transfer.

When the gate GM produces an output as previously described with reference to FIGURE 2 the outputs and inverse outputs from the staticisors IS5 to IS8 are applied to staticisors S5 to S8, through gates 5A and 5B to gates 8A and 8B respectively, so that they are set up in accordance with the state of the staticisors IS5 to IS8. The outputs from the staticisors S5 to S8 set up a combined write and read electronic tree CT to produce an output on one of the lines L1 to L16 to select one of the 16 write heads and the corresponding one of the 16 read heads in a manner similar to that described in U.S. patent application Serial No. 255,888 with reference to FIGURE 10.

The output from the gate GM also permits the staticisor S10 to be set up through gates 10A and 10B as shown to correspond to the staticisor IS10, and also sets up the magnetic transfer-timer trigger 101 through a two millisecond delay device comprising a trigger 104, a delay 105 and an end element 106 in which when the trigger 104 is reset, which occurs two milli-seconds after it was put on by the output from the gate GM, the end element 106 produces an output pulse. As a result of these two operations an output is produced from either a gate 107 or 108 in accordance with the state of staticisor S10 so that a write or read transfer takes place in a manner similar to that described in copending U.S. patent application Serial No. 255,888 with reference to FIGURE 10.

In addition to setting the staticisor S10 the output from either the gate 10A or 10B (depending upon the state of the staticisor IS10) is used to open either gates RA and RB or gates WA and WB and thereby permit either a read staticisor SR or a write staticisor SW respectively to be set up in accordance with the state of the instruction staticisor IS9 which records the required position of the head assembly to be concerned in the pending transfer. The output of the read staticisor SR is used to control, through a read mechanical selector RM, which of the two positions the read head assembly RY is to be set in; while the output of the write staticisor SW is used to control, through a write mechanical selector WM, which of the two positions the write assembly WY is to be set in. If a change in the position of either assembly is ordered, the magnetic transfer-timer trigger 101 is prevented from being set for about 100 milliseconds in a manner which is not shown in FIGURE 3, but which is similar to that shown in and described with reference to FIGURE 5 in connection with the outputs from staticisors S17A to S19A.

It will be appreciated that a similar alternative arrangement to that shown in FIGURES 1 and 2 could be provided in which the five destination digits 11 to 15 are used to specify the 32 magnetic locations and one special permutation of source digits out of the 32 possible permutations is used to specify the magnetic destination DM. This alternative arrangement requires the arrangement shown in FIGURE 2 to be modified to the extent of changing the inputs to gates G5 to G9 from the outputs of staticisors IS5 to IS9 to the outputs of staticisors IS11 to IS15, and at the same time changing the input DM to the gate GM from a special output of the destination tree DT to a special output of the source tree ST.

In this case, however, it is necessary to inhibit the normal action of the destination digits of an instruction word as the output of the destination tree DT specifying a magnetic recording track will inadvertently open a destination in the main digital storage system to any stray digit signals on the interconnecting highway. This necessary inhibiting action may be effected by inserting an inhibition gate controlled by the gate GM in each of the five inputs to the destination tree DT so that an output is produced on the same particular output line from the destination tree DT whenever a magnetic transfer is ordered. This particular output can itself be provided with an inhibiting gate controlled by the gate DM.

The magnetic transfer control arrangement which has now been described with reference to FIGURES 1, 2 and 3 cannot be used to control transfers to and from more than 32 locations (generally tracks) in a magnetic store as there are only five source digits (and only five destination digits) in the standard instruction word as set out in FIGURE 1. If more than 32 locations are required to be specified (either because of the size of the magnetic store or the organisation of the computer) it is necessary to use digits other than the source digits (or destination digits) in one instruction word or to use an instruction word and another word (which may be either an instruction or number word) to specify all the locations.

Various alternative arrangements for controlling a magnetic store having a large number of locations will now be described with reference to FIGURES 4, 5 and 6.

Figure 4:
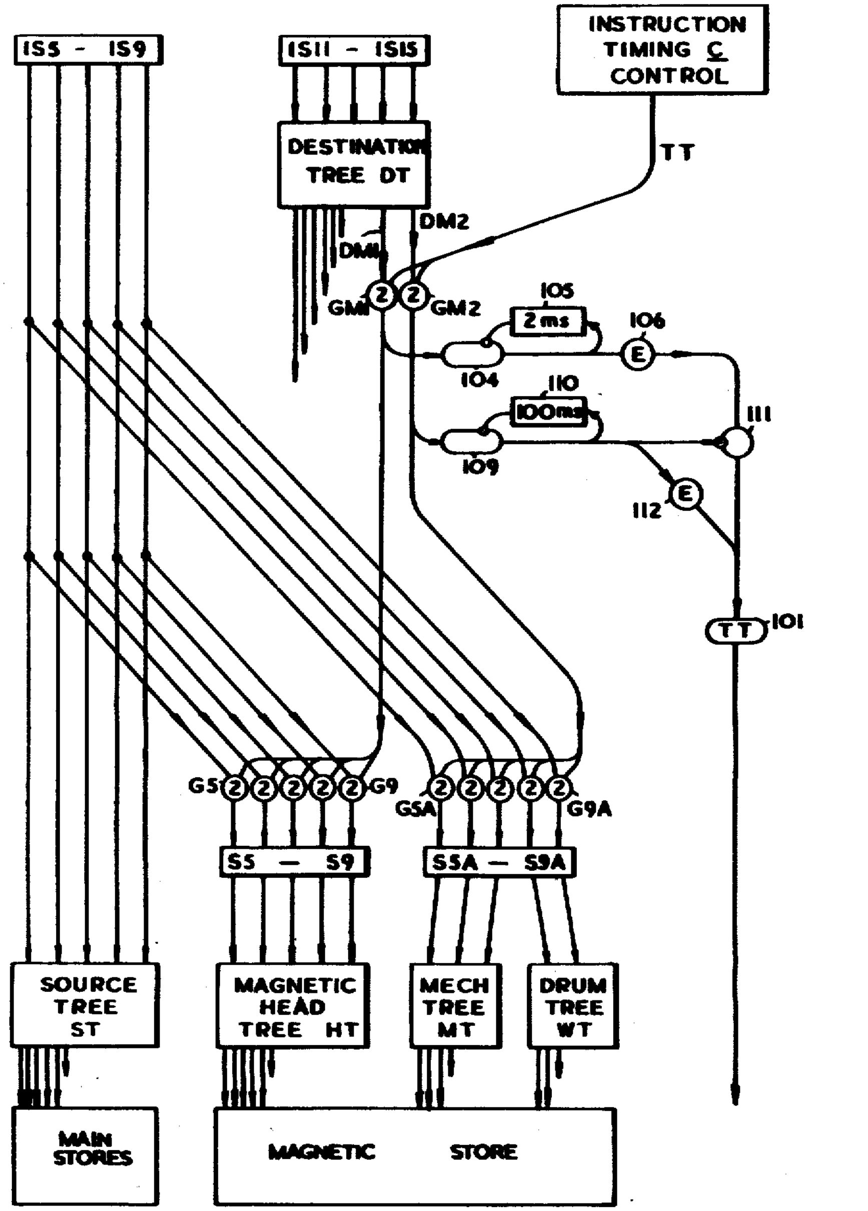

FIGURE 4 shows an arrangement for controlling a magnetic store having 1024 locations (tracks) by means of two instruction words. It is a feature of this arrangement that almost all transfers can be controlled by one of the instruction words, and the two instruction words are only occasionally required.

The arrangement is for controlling a magnetic store comprising four separate drums, each drum having 256 tracks, digit signals being transferred to each drum by an assembly of 32 writing heads which can be set in eight positions so that each head can write on eight tracks, and digit signals being read from each drum by an assembly of 32 reading heads which can be similarly set in eight positions.

The particular writing head or reading head required in an assembly is specified by the five source digits (5 to 9) in (first) instruction word whose destination digits specify a first magnetic destination DM1; while of the five source digits in a (second) instruction word, whose destination digits specify a second magnetic destination DM2, the first three are used to specify which of the eight possible positions the head assemblies are to be set in, while the last two digits specify which of the four drums is to take part in the pending transfer. During the course of a computing operation, words will be delivered to and taken from the magnetic store and the computing operation is organised in such a way that in most cases successive magnetic transfers concern the write and read head assemblies of one particular drum in one particular mechanical position as when this is so, only the first instruction word is required to specify each transfer. This requirement is met by organising the computing operation to require the services of a section of the magnetic store which has 32 locations for as long as possible before the services of another section are required.

This requirement is not objectionable as, apart from needing two instruction words, a change in the mechanical position of a head assembly takes up to 100 milliseconds to be effected, whereas a change in the particular head in a head assembly is carried out in a small fraction of this time.

The arrangement shown in FIGURE 4 is a modification of the arrangement shown in FIGURE 2 by which provision is made in the magnetic control circuits, to staticise separately, and if necessary contemporaneously, digits in two different instruction words when the destination digits of one specified the magnetic destination DM1 and those of the other specify DM2. In FIGURE 4 the next instruction source staticisors IS2 to IS4 and their tree IST, and the write/read staticisor IS10 and its gate G10 and magnetic staticisor S10 are not shown as they function as shown in FIGURE 2.

An instruction word specifying a destination DM1 functions as an instruction word specifying a destination DM in the arrangeemnt shown in FIGURE 2 and the gates G5 to G9, the staticisors S5 to S9 and the magnetic head tree HT (corresponding to the magnetic track tree T) function as they did in the arrangement shown in FIGURE 2 when an output is produced from gate GM1. Also the circuit elements 104, 105, 106 and the magnetic transfer-timer 101 function as in FIGURE 2, except when the gate 111 is non-inhibiting which occurs only when an instruction word specifying the second magnetic destination DM2 is sent to the instruction control circuits.

When a magnetic transfer is ordered which requires a change in the position of the head assemblies or drum from those concerned in the preceding transfer an instruction word is sent to the instruction control circuits whose five source digits specify the new head assembly position and drum required, and whose destination digits specify the second magnetic destination DM2. A gate GM2 thereupon produces an output (when the TT output from the instruction timing control C is on), and this output from the gate GM2 opens five gates G5A to G9A connected to the outputs from the instruction staticisors IS5 to IS9 in parallel with the gates G5 to G9 with the result that the five source digits are staticised on the staticisors S5A to S9A. The outputs from the staticisors S5A to S7A set up a mechanical tree MT to specify the head assembly position required, while the outputs from the staticisors S8A and S9A set up a drum tree WT to select the drum required.

The output from the gate GM2 is also used to set a trigger 109 with the result that the gate 111 is closed and the magnetic transfer-timer 101 cannot be put on by an output from the end element 106. The trigger 109 is put off 100 milliseconds later, by its own output applied to its resetting connection through a delay 110, and causes an end element 112 to put on the magnetic transfer-timer 101.

This arrangement whereby a magnetic transfer does not take place for 100 milliseconds after the receipt of an instruction word specifying destination DM2 is provided as in most cases a change in the mechanical position of the head assemblies will be required and a period of up to 100 milliseconds must be allowed for this.

This arrangement imposes a 100 milliseconds delay when a change in the drum concerned is ordered although this may not be necessary. Changes in the drum concerned are rare occurrences during a computing operation so that delays at these times are not important. However, if desired, they may be eliminated by employing an alternative arrangement which is shown in FIGURE 5.

If more than 10 digits are required to specify all the locations in a magnetic store a third instruction word specifying a third magnetic destination DM3 may be used. Additional circuit arrangements associated with a third magnetic destination DM3 would be required further to those shown in FIGURE 4. This third instruction word would be required only on very rare occasions.

The arrangement described in connection with FIGURE 4 uses the source digits and only one further digit (digit 10) to control the magnetic store. Further digits may be employed to control the magnetic store, and in general all digits can be employed other than the group which in a selected permutation sets the instruction word to direct a magnetic transfer and those digits concerned in the supplying of the next instruction word to the instruction control.

Figure 5:
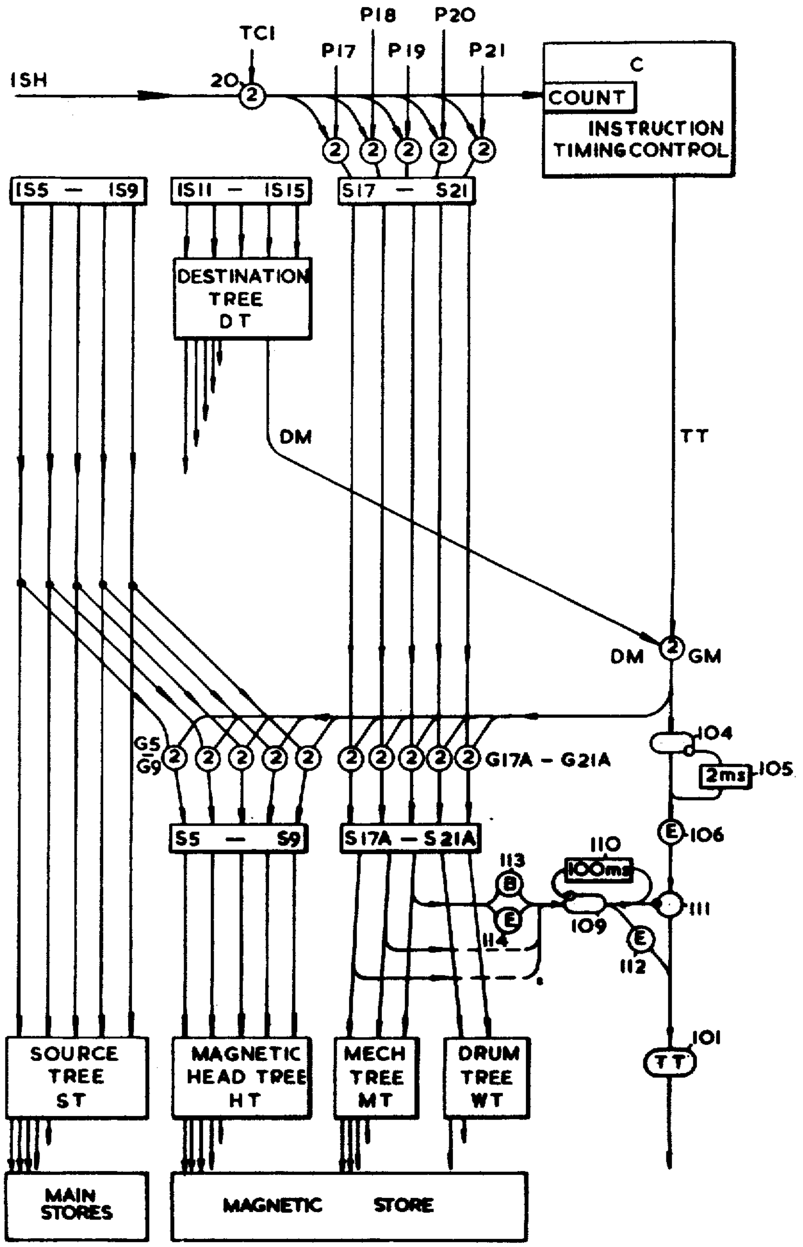
FIGURES 5 and 6 show two alternative arrangements for controlling the magnetic store.
Figure 6:
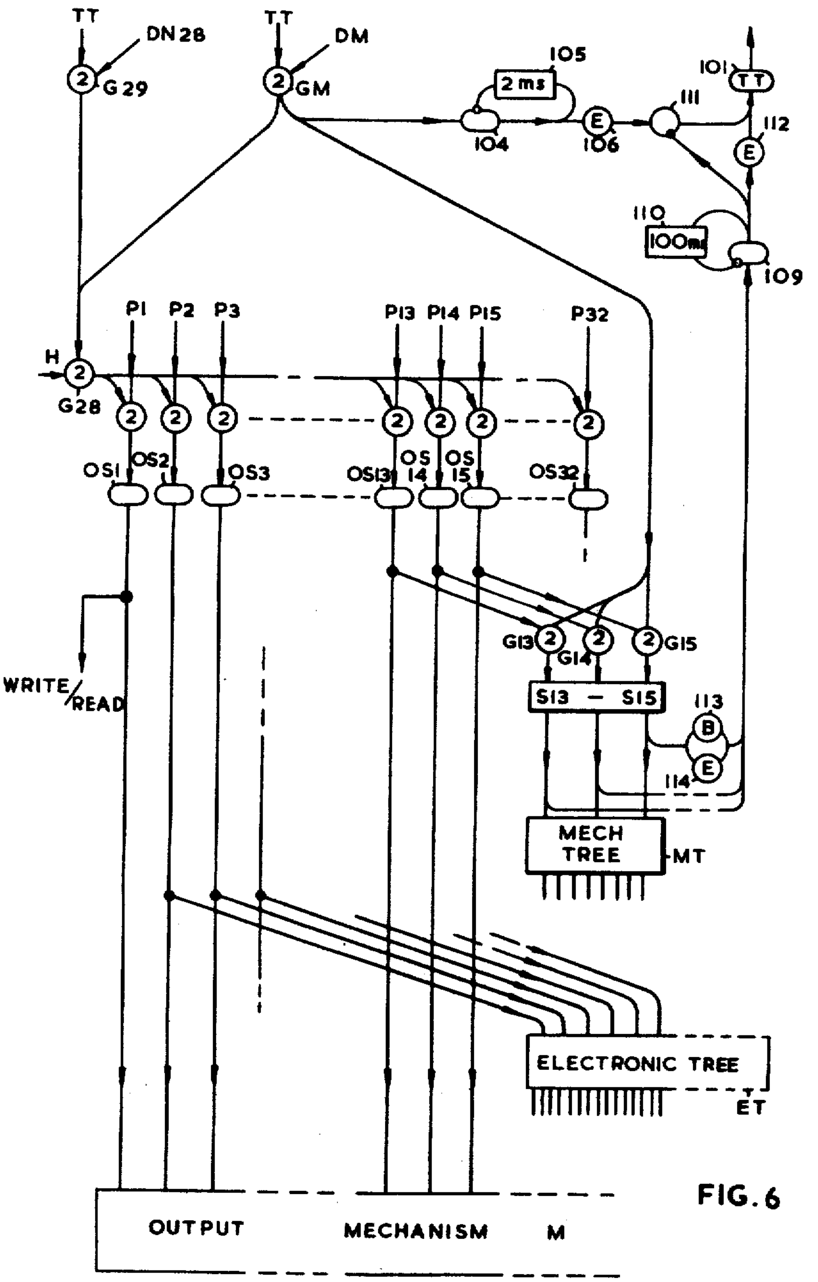

The arrangement shown in FIGURE 5 shows modifications to the arrangement shown in FIGURE 4 which, using more digits of a single instruction word, is able to direct a transfer to or from a magnetic store having 1024 internal locations organised as the arrangement described with reference to FIGURE 4. When the destination digits in this instruction word specify the magnetic destination DM, the five source digits (5 to 9) are used to specify one head out of 32 in a head assembly, the serial digit (digit 10) specifies whether a write or read transfer is required, and the wait digits (17 to 21) specify the mechanical position of the head assemblies and the drum concerned.

The outputs of the source staticisors IS5 to IS9 are connected as shown in FIGURES 2 to 4 to the normal source tree ST, and in parallel to the gates G5 to G9, through which they are passed to the staticisors S5 to S9 to set up the magnetic head tree HT when an output is produced by the gate GM. The wait digits in an instruction word, which are not normally staticised, must be staticised before they are applied to the instruction timing control circuits which counts the number the wait digits represent. The wait digits are staticised by connecting the input from the instruction highway ISH, along which the incoming instruction word is fed to the instruction control circuits, directly to staticisors S17 to S21 through gates conditioned by the appropriate P pulses P17 to P21 as shown. A gate 20, controlled as shown by pulses TC1, is preferably provided so that one new instruction word only is admitted through it when the present instruction word has been obeyed. Thus the digits staticised in the staticiors S17 to S21 are not displaced until some time after their outputs have been transferred to staticisors S17A to S21A and so are no longer required to be retained by staticisors S17 to S21. The staticisors S17A to S21A are set up when the staticisors S5 to S9 are set by the output from the gate GM acting on five gates G17A to G21A as shown.

Provided a change in the mechanical position of the head assemblies is not ordered the gate 111 is non-inhibiting, and the magnetic transfer-timer 101 is put on 2 milliseconds after a TT output is produced through the circuit elements 104, 105 and 106 as already described with reference to FIGURE 3. A beginning element 113 and an end element 114 are also provided (as shown for the output of staticisor S19A) for each of the staticisors S17A, S18A, and S19A in order to produce an output to put on a trigger 109 whenever there is a change in the state of any one of the staticisors S17A, S18A or S19A which control the mechanical tree MT. The trigger 109, the delay 110, the end element 112 and the gate 111, thereupon act as described in connection with FIGURE 4 to put the magnetic transfer-timer 101 on 100 milliseconds after, instead of 2 milliseconds after, the production of a TT output. U.S. patent application Serial No. 290,014 describes an instruction control which generates TCI pulses for controlling the gate 20. Also, if as described in this application, the wait digits are not used to time the sending of the next instruction word to the instruction control, they may have any value in accordance with the specified magnetic location as the maximum delay imposed by a wait number is considerably less than the duration of a magnetic transfer.

If more than 10 digits are required to specify all the locations in a magnetic store, a first instruction word whose destination digits specify a first magnetic destination DM1 and whose source digits and wait digits specify magnetic store locations can be used together with a second instruction word whose destination digits specify a second magnetic destination DM2 and whose source digits and wait digits specify further magnetic store locations. The circuit arrangements required would be a suitable combination of those shown in FIGURES 4 and 5.

The modifications to the arrangements shown in FIGURES 4 and 5 to enable more than 10 digits to be available to specify locations in a magnetic store involve a fair amount of additional equipment. An alternative arrangement for providing more than 10 digits for this purpose which uses less additional equipment will now be described with reference to FIGURE 6.

By the arrangement the output staticisors OS1 to OS32 which are already present in a computer in order to staticise a 32 digit word while it is being written into an output mechanism M by which it is read out of the computer, are also used to staticise a special number word called a magnetic instruction word while it is setting up the control circuits of a large magnetic store. There are therefore 32 digits available for specifying the nature of a magnetic transfer.

When the output staticisors are used to transmit a number word to the output mechanism M, this word is transferred to the output staticisors by an ordinary instruction word which specified the source of the word, the transfer period, and the destination DN28. An output DN28 is thus supplied to a gate G29 so that when the TT output of the instruction control goes on, the gate G29 produces an output which opens a destination gate G28 to the number word on highway H which is thereupon staticised in the output staticisors OS1 to OS32.

When the output staticisors are used to staticise a magnetic instruction word, this word, which is organized in a remote digital store source, is transferred to the output staticisors along the highway H by an instruction word which specifies the source of the word, the transfer period, and the magnetic destination DM. An output DM is thus supplied to a gate GM so that when the transfer-timer TT output goes on, the gate GM produces an output which is used to open the gate G28 so that the magnetic instruction word is admitted and is staticised on the output staticisors. In the arrangement shown in FIGURE 6, digit 1 is used to order a write or a read transfer, digits 2 to 15 are used to specify one particular location out of 16,384 locations in the magnetic store, while digits 16 to 32 are not used.

Of the digits 2 to 15, digits 2 to 12 are used to control an electronic tree ET which is obeyed within a short time (less than 2 milliseconds) after they are set up. The electronic tree controls the choice of write or read head in a head assembly and choice of the drum to be concerned in a magnetic transfer. For example, digits 2 to 7 may be used to select one particular head out of 64 heads, and digits 8 to 12 to select a particular drum out of 32 drums. The three remaining digits 13 to 15 are used to control the mechanical position of the head assemblies through a mechanical tree MT, which is obeyed within a relatively long time (up to 100 milliseconds).

The output from the gate GM which opens the gate G28 to permit a magnetic instruction word to be staticised on the staticisors OS1 to OS15 is also used to open the gates G13 to G15 to allow the staticisors S13 to S15 and the mechanical tree MT to be set up by the outputs from the staticisors OS13 to OS15. The gates G13 to G15 are provided to prevent the staticisors S13 to S15 and the mechanical tree MT being disturbed by changes in the state of the staticisors OS13 to OS15 caused by words sent to the output staticisors in order to be written into the output mechanism M.

Corresponding gates and staticisors are not provided in the input leads to the electronic tree ET because, as this tree is rapidly obeyed, it does not matter if it is altered by a number word sent to the output staticisors.

The output from the gate GM is also applied to circuit elements 104, 105, and 106 which put on the magnetic transfer-timer 101 after 2 milliseconds provided gate 111 is open. Gate 111 is closed only if a change in the mechanical position of a head assembly is taking place due to a change in the state of one of the staticisors S13 to S15. When this is so circuit elements 113, 114, or the corresponding elements (not shown) connected to staticisors S13 and S14, and elements 109, 110 and 112 function as described with reference to FIGURE 5 to put on the magnetic transfer-timer 101 after a delay of 100 milliseconds.

What we claim is:

1. An electronic digital computer comprising main digital stores, a main control arranged for receiving instruction word signals and controlled by the said instruction word signals, an output staticisor normally for staticising word signals to be fed to the output of the computer, a first transfer path between the main digital store and the output staticisor, a supplementary digital store, supplementary control means, a second transfer path between the main digital store and the supplementary digital store set up by said supplementary control means, a first gating means in the first transfer path and connected to said main control to allow words to be transferred from the main digital store to the output staticisor, means, including second gating means, connecting the output staticisor to the supplementary control means to control said supplementary control means to set up the said second transfer path, means connected to said main control for timing a transfer along the said second transfer path, a third gating means and a fourth gating means each conditioned by the main control, a first particular permutation of the instruction word digit signals causing the main control to condition the third gating means only and a second particular permutation of the instruction word digit signals causing the main control to condition the fourth gating means only, the output of the third gating means conditioning the first gating means and the output of the fourth gating means conditioning the first gating means and the second gating means and also conditioning the means for timing a transfer along the second transfer path.

2. An electrical digital computer as claimed in claim 1 and in which the supplementary store consists of a plurality of locations, the supplementary control including a tree circuit, each output of the tree circuit being connected to a particular location of the supplementary store.

References Cited in the file of this patent

UNITED STATES PATENTS

| | | |
|---|---|---|
| 2,674,733 | Robbins | Apr. 6, 1954 |
| 2,735,082 | Goldberg | Feb. 14, 1956 |
| 2,789,759 | Tootill et al. | Apr. 23, 1957 |
| 2,797,862 | Andrews et al. | July 2, 1957 |
| 2,800,278 | Thomas | July 23, 1957 |
| 2,815,168 | Zukin | Dec. 3, 1957 |
| 2,911,622 | Ayres | Nov. 3, 1959 |

FOREIGN PATENTS

| | | |
|---|---|---|
| 507,259 | Belgium | Dec. 15, 1951 |